United States Patent
Cepulis et al.

(10) Patent No.: US 7,103,766 B2
(45) Date of Patent: Sep. 5, 2006

(54) SYSTEM AND METHOD FOR MAKING BIOS ROUTINE CALLS FROM DIFFERENT HARDWARE PARTITIONS

(75) Inventors: Darren J. Cepulis, The Woodlands, TX (US); David Collins, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 550 days.

(21) Appl. No.: 10/324,946

(22) Filed: Dec. 20, 2002

(65) Prior Publication Data

US 2004/0123092 A1    Jun. 24, 2004

(51) Int. Cl.
*G06F 9/445* (2006.01)
*G06F 12/00* (2006.01)

(52) U.S. Cl. .......................... 713/2; 710/200; 711/150
(58) Field of Classification Search .................... 713/2, 713/1; 710/200; 718/104; 711/150, 153; 717/127

See application file for complete search history.

(56) References Cited

U.S. PATENT DOCUMENTS

| | | | |
|---|---|---|---|
| 5,063,496 A * | 11/1991 | Dayan et al. ................. 726/27 |
| 5,560,018 A * | 9/1996 | Macon et al. ................ 710/260 |
| 5,790,851 A * | 8/1998 | Frank et al. ................. 718/104 |
| 5,892,943 A * | 4/1999 | Rockford et al. ............... 713/2 |
| 5,893,157 A * | 4/1999 | Greenspan et al. ......... 711/150 |
| 5,966,543 A * | 10/1999 | Hartner et al. .............. 710/200 |
| 5,991,895 A | 11/1999 | Laudon et al. |
| 6,081,664 A * | 6/2000 | Nowlin, Jr. .................. 717/127 |
| 6,247,109 B1 | 6/2001 | Kleinsorge et al. |
| 6,314,501 B1 * | 11/2001 | Gulick et al. ................ 711/153 |
| 6,336,120 B1 | 1/2002 | Noddings et al. |
| 6,381,682 B1 | 4/2002 | Noel et al. |
| 6,782,440 B1 * | 8/2004 | Miller ......................... 710/200 |

OTHER PUBLICATIONS

Lucci et al, Reflective-Memory Multiprocessor, 1995, IEEE, pp. 85-94.*

* cited by examiner

*Primary Examiner*—Chun Cao
*Assistant Examiner*—Suresh K Suryawanshi

(57) ABSTRACT

The specification may disclose systems and related methods for ensuring that as between two partitions in a computer system, each partition using a separate operating system, calls to basic input output system (BIOS) routines are managed in such a way that only one instance of a BIOS routine is allowed to execute within the computer system at any one time. The systems and methods may accomplish this task by implementing an abstraction program through which the various operating systems may call BIOS routines, the abstraction program implementing the desired functionality.

23 Claims, 2 Drawing Sheets

SYSTEM AND METHOD FOR MAKING BIOS ROUTINE CALLS FROM DIFFERENT HARDWARE PARTITIONS

BACKGROUND

Computer systems may comprise multiple processors, large amounts of random access memory (RAM), and multiple hard disk storage devices. Collectively, these devices may be referred to as computer system resources. The system resources may be logically partitioned with a different operating system running in each partition. That is, in a multiple processor system, one or more processors, a portion of the available main memory, and/or one or more of the disk storage devices may operate under a first operating system. The remaining processors, main memory, and/or disk storage devices may operate under a second operating system. While this example describes only two partitions, any number of partitions may be utilized. The operating systems may be multiple instances of the same operating system, or different operating systems, e.g., Linux™ operating in one partition and Windows® operating in a second partition. This may allow the computer system to perform multiple tasks using operating systems best suited for each particular task.

Regardless of the logical partitioning, there may also be shared resources within the computer system. Computer programs or routines stored in the computer's read only memory (ROM) may be one example of shared resource. The various routines embodied in the ROM may perform low-level hardware manipulation. The ROM programs may alternatively be referred to as processor abstraction layer (PAL) and/or system abstraction layer (SAL) routines.

Some of the PAL and SAL routines may not be non-reentrant, i.e., these programs may need to run to completion before starting another instance of the same program in the computer system regardless of which operating system calls the routine. In computer systems implementing a single operating system, the single operating system may be responsible for ensuring that only one instance of non-reentrant PAL and SAL routines execute within the computer system at any one time. Ensuring this type of operation with respect to non-reentrant routines may be known as providing "spinlocks." That is, a second attempt to invoke a routine while a first instance is still executing may result in blocking or locking the second attempt, requiring the calling program to "spin" in a software loop and attempt to invoke the routine at a later time. In partitioned systems using independent operating systems within each partition, each operating system may be responsible for ensuring non-reentrant access to PAL and SAL routines within its partition; however, the multiple systems may not be aware of each other, thus creating the possibility that there could be multiple calls to non-reentrant PAL or SAL routines from the various partitions. In this circumstance, it is possible that the computer system may experience operational errors, or "crash," because of the lack of a technique to provide spinlocks between partitions.

BRIEF DESCRIPTION OF THE DRAWINGS

For a detailed description of various embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF EMBODIMENTS OF THE INVENTION

The following discussion is directed to various embodiments of the invention. Although one or more of these embodiments may be preferred, the embodiments disclosed should not be interpreted or otherwise used as limiting the scope of the disclosure, including the claims, unless otherwise specified. In addition, one skilled in the art will understand that the following description has broad application, and the discussion of any embodiment is meant only to be exemplary, and not intended to intimate that the scope of the disclosure, including the claims, is limited to these embodiments.

Figure 1:
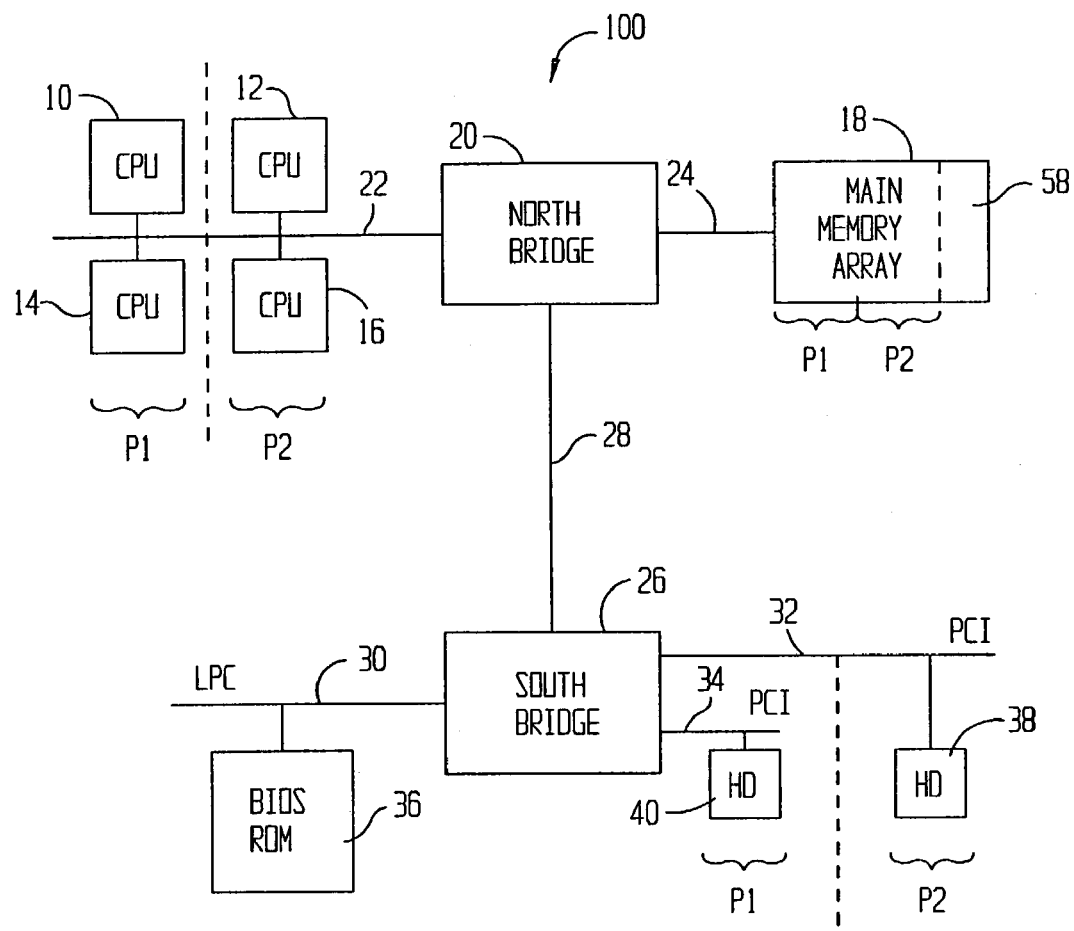
FIG. 1 illustrates a computer system 100 in accordance with embodiments of the invention.

Referring initially to FIG. 1, there is illustrated a computer system 100 constructed in accordance with embodiments of the invention. Computer system 100 may comprise a plurality of processors 10, 12, 14, 16 coupled to a main memory array 18, and various other peripheral computer system components, through an integrated bridge device 20. In the exemplary computer system of FIG. 1, the bridge device 20 may be labeled "North Bridge" because of its location on computer system drawings. Each of the CPU's may couple to the North Bridge 20 by way of a host bus 22. The processors 10, 12, 14 and 16 may comprise Itanium™ processors made by Intel Corporation; however, the techniques of the present invention may be equivalently implemented in computer systems utilizing different types of processors. Because of the possibility of implementation with different processors, the computer system 100 may implement other bus configurations or bus bridges in addition to, or in place of, those illustrated in FIG. 1.

The main memory array 18 may couple to the North Bridge 20 through a memory bus 24. The North Bridge 20 may comprise a memory control unit (not specifically shown) that controls transactions to the main memory array 18 by asserting necessary control signals during memory accesses. The main memory array 18 may function as the working memory for each of the processors 10, 12, 14 and 16, and may comprise a conventional memory device or array of memory devices in which programs, instructions and data may be stored. The main memory array 18 may comprise any suitable type of memory such as dynamic random access memory (DRAM), or any of the various types of DRAM devices such as synchronous DRAM (SDRAM), extended data output DRAM (EDO DRAM), or RAM bus™ DRAM (RDRAM).

The computer system 100 may also comprise a second bridge logic device 26 that may bridge a primary expansion bus 28 to various secondary expansion buses, such as a low pin count (LPC) bus 30, and one or more peripheral component interconnect (PCI) buses 32 and 34. Much like North Bridge device 20, the bridge device 26 may be referred to as a "South Bridge" based primarily on its location in computer system drawings. The primary expansion bus 28 may comprise any suitable bus for coupling the North Bridge 20 and South Bridge 26. For example, in some embodiments the primary expansion bus 28 may be a PCI bus. In other embodiments, the primary expansion bus 28 may be a Hublink™ bus, which is a proprietary bus of Intel Corporation.

Still referring to FIG. 1, a basic input output system (BIOS) read-only memory (ROM) 36 may couple to the South Bridge device by way of the LPC bus 30. The BIOS ROM 36 may contain procedures and routines executable by one or more of the processors 10, 12, 14, or 16. In particular, the software procedure may comprise commands and instructions executed during and just after power-on self test (POST) procedures. The software routines may comprise commands to implement low-level hardware and system manipulation, which may be referred to as BIOS calls or BIOS routines.

Still referring to FIG. 1, the computer system 100 may further comprise a plurality of PCI buses 32, 34. Although the exemplary computer system 100 has only two types of secondary expansion buses, the LPC bus 30 and the PCI buses 32, 34, the computer system 100 may support many different types of communication buses. Each of the PCI buses 32, 34 illustrated in FIG. 1 may have coupled thereto a disk drive (HD) 38, 40 respectively. Thus, data stored on the disk drives 38, 40 may be accessed by the processors 10, 12, 14 and 16 through the various bridges and communication buses. While FIG. 1 illustrates only two disk drives, each coupled to different PCI buses, any number of disk drives may be used, including disk drives implemented in a redundant array of independent disks (RAID) system. Moreover, while each disk drive 38, 40 is shown coupled to its own PCI bus 32, 34 respectively, the disk drives may be coupled to the same PCI bus, or may be coupled to different types of buses.

Figure 2:
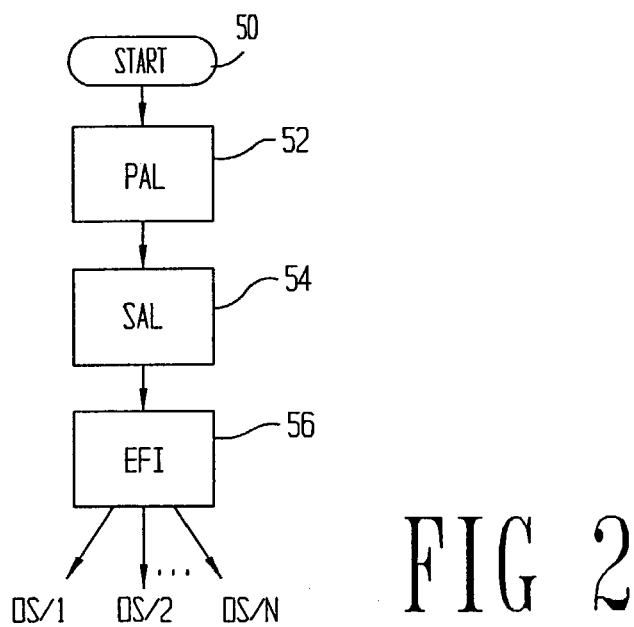
FIG. 2 illustrates a flow diagram of an exemplary power-on sequence that may be utilized in accordance with embodiments of the invention.

Referring now to FIG. 2, there is illustrated a flow diagram for a boot process for a computer system, such as computer system 100. In particular, the process may start (block 50) with an action such as powering the computer, or a remote command to begin power-up procedures. Thereafter, the processor abstraction layer (PAL) procedures stored on the BIOS ROM 36 may be executed (block 52). The PAL procedures may perform hardware level initializations, such as hardware initialization of the processors 10, 12, 14 and 16, main memory 18, PCI buses 32, 34, and the like. For purposes of this specification, PAL and SAL procedures may refer to software executed during the boot process; whereas, PAL and SAL routines, discussed below, may refer to software executed after loading of an operating system. There may, however, be PAL and SAL procedures that are also utilized as routines. Once the PAL procedures have completed the initialization process, system abstraction layer (SAL) procedures execute (block 54). While the SAL procedures may perform many functions during the boot sequence, for purposes of the embodiments of this invention, the SAL procedures may be responsible for gathering and compiling a list or table of available resources of the computer. Such a resource list may comprise the type and number of processors 10, 12, 14 and 16, the type and amount of memory in the main memory array 18, the number of disk drives 38, 40, and the like.

The computer system 100, in accordance with embodiments of the invention, may have the capability of logically partitioning the computer system resources, and then executing multiple operating systems, one each in each partition. Referring again to FIG. 1, in exemplary computer system 100 the available processors may be logically partitioned, e.g., into two partitions P1 and P2. Thus, processors 10 and 14 may operate under a first operating system, and processors 12 and 16 may operate under a second operating system. Likewise, the main memory array and the disk drives may be logically partitioned as illustrated in FIG. 1.

Returning to FIG. 2, the SAL procedures may pass to an extensible firmware interface the resource list of all available resources on the computer system 100. The extensible firmware interface system may perform the logical partitioning of the resources in the list, based on predefined partition criteria, or possibly based on information provided by way of a user interface (not shown). For a description as to the specifics of the partitioning by the extensible firmware interface system, reference may be made to co-pending application Ser. No. 10/023,680 filed Dec. 18, 2001, titled "Multi-O/S System and Pre-O/S Boot Technique for Partitioning Resources and Loading Multiple Operating Systems Thereon," assigned to the same assignee, and incorporated herein by reference as if reproduced in full below. Thus, using the table of resources provided by the SAL procedures, the extensible firmware interface may divide the available resources and may start a plurality of operating systems (block 56), each operating system assigned one of the logical partitions. Before proceeding, it should be understood that an operating system running within a logical partition may be any available operating system which is capable of executing on the hardware of the computer system. Moreover, the operating -systems need not be the same operating system, but may be operating systems provided from different software companies. For example, in the two-partition system illustrated in FIG. 1, the partition P1 may operate a Linux™ operating system, while the partition P2 may operate a Windows® operating system. Alternatively, the partitions may operate two instances of the same operating system. As yet a further alternative, the two instances of the operating system may be of the same brand, but different versions.

The PAL and SAL routines, as opposed to the PAL and SAL procedures, may perform low-level functions during operation of the computer system 100 after the boot process. In order to facilitate efficient reading and execution of the PAL and SAL routines, embodiments of the invention copy or shadow the PAL and SAL routines to a shadow area 58 of the main memory array 18. Thus, to the extent any of the PAL or SAL routines need to be executed during operation of the computer system 100, the routines may be read from the shadowed memory 58.

Figure 3:
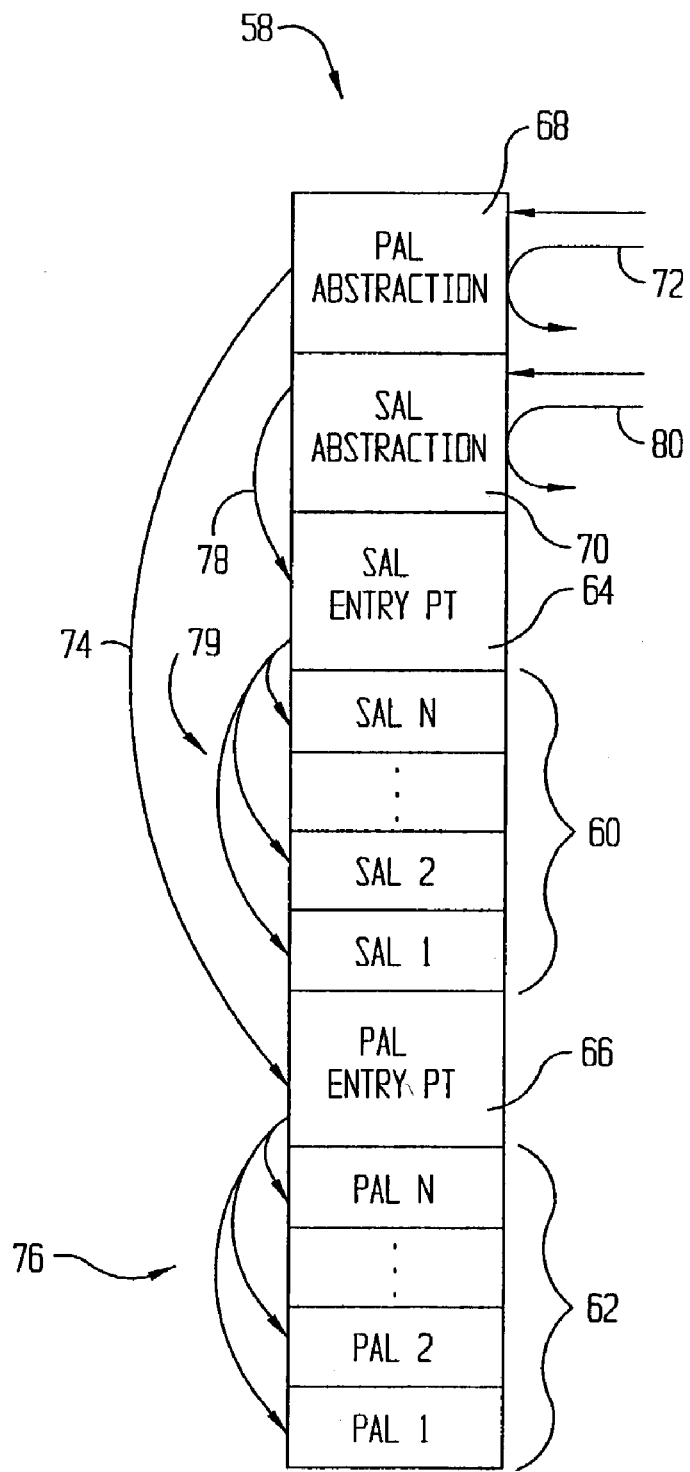
FIG. 3 illustrates a portion of main memory having shadowed BIOS routines in accordance with embodiments of the invention.

FIG. 3 illustrates a portion of the shadowed memory 58. In particular, the shadowed memory 58 may comprise a plurality of SAL routines 60 including individual routines (SAL 1, SAL 2, . . . SAL N) and a SAL entry point 64. Likewise, the shadowed RAM 58 may comprise a plurality of PAL routines 62, including the PAL routines (PAL 1, PAL 2, . . . PAL N) and a PAL entry point 66. In the various embodiments of this invention, additional procedures or routines may be programmed into the BIOS ROM 36, and likewise may be shadowed to the shadow RAM 58. These additional routines may comprise a PAL abstraction layer 68 routine, as well as a SAL abstraction layer 70 routine, each discussed more fully below.

The operating systems utilized in each partition may not be aware of other operating systems in use within the same computer system 100. Each operating system may implement spinlocks with respect to non-reentrant PAL and SAL routines for software operating under the operating system's control. That is, each operating system may ensure that for program calls to PAL and SAL routines that are non-reentrant, each PAL and SAL routine started runs to completion prior to allowing another instance of a PAL or SAL routine to begin execution. However, when multiple operating systems are utilized in a single computer system, such as computer system 100, those operating systems may not have the capability of providing spinlocks to BIOS routines as between them. In order to address this concern, the various embodiments of the present invention may implement a PAL abstraction layer routine 68 and SAL abstraction layer routine 70. These abstraction layers may be software routines stored in the BIOS ROM 36 and shadowed to shadow area 58. In the various embodiments, the PAL abstraction layer and SAL abstraction layer may implement spinlocks with respect to each operating system to ensure that, as between the two (or more) operating systems, a second call to a non-reentrant PAL or SAL routine is not allowed until a previously called instance of the same routine runs to completion. Stated otherwise, the PAL and SAL abstraction layer may refrain from invoking a PAL or SAL routine if the routine is already in use.

Referring again to FIG. 2, when the extensible firmware interface passes a partitioned table of resources to each operating system (block 56), in the various embodiments the EFI may also pass an indication of a location of each of the PAL abstraction layer routine 68 and the SAL abstraction layer routines 70. The indication passed may be equivalently referred to as an entry-point, a handle, or a pointer, all of which may reveal the beginning memory location for the PAL and SAL abstraction layer routines. The PAL abstraction layer routines 68 may provide access to the PAL routines 62, and may also provide spinlocks, as illustrated by arrow 72 of FIG. 3. Stated otherwise, if a first operating system, for example an operating system utilizing hardware in the logical partition P1, needs to make a PAL routine call for a non-reentrant routine, that PAL routine call may be made to the PAL abstraction layer routine 68, which may pass the request to the PAL entry point 66, as indicated by arrow 74. The PAL entry point 66 thus may provide access to specific PAL routines, as indicated by lines 76. If prior to the completion of the PAL routine called by the first operating system, a second operating system, e.g., the operating system in logical partition P2, makes a similar PAL routine call, the PAL abstraction layer 68 may assert a spinlock, effectively denying access to the second call and requesting that the second operating system try the request again at a later time.

Likewise with respect to the SAL abstraction layer routine 70, if a first operating system makes a SAL routine call, that request may be made to the SAL abstraction layer routine 70, which may pass the request to the SAL entry point 64 as indicated by arrow 78. The SAL abstraction routine exemplified by block 70 may pass the request to the various SAL routines, as illustrated by lines 79. If a second operating system, e.g., the operating system in logical partition P2, makes a similar SAL routine call, the SAL abstraction layer may provide spinlocks for the second calling operating system, as exemplified by line 80.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a computer system comprising:
   executing a plurality of operating systems one each in a plurality of hardware partitions within the computer system; and
   calling a basic input output system (BIOS) routine by the operating systems by:
      calling an abstraction program by the plurality of operating systems;
      invoking, by the abstraction program, the BIOS routine if the BIOS routine is not in use; and
      refraining from invoking the BIOS routine if the BIOS routine is in use.

2. The method as defined in claim 1 wherein the invoking the BIOS routine further comprises calling one or both of processor abstraction layer (PAL) routines arid system abstraction layer (SAL) routines.

3. The method as defined in claim 2 wherein calling an abstraction program by the operating systems further comprises:
   calling a PAL abstraction program when seeking access to PAL routines; and
   calling a SAL abstraction program when seeking access to SAL routines.

4. The method as defined in claim 1 wherein executing the plurality of operating systems one each in the plurality of hardware partitions further comprises:
   shadowing BIOS routines to a first portion of a main memory;
   shadowing the abstraction program to the first portion of main memory;
   assigning a first processor of the computer system to a first hardware partition, and assigning a second processor of the computer system to a second hardware partition; and
   dividing a second portion of the main memory between the first and second hardware partitions.

5. The method as defined in claim 4 wherein shadowing BIOS routines to the first portion of the main memory further comprises:
   copying program abstraction layer (PAL) routines from a read only memory (ROM) device to the first portion of main memory; and
   copying system abstraction layer (SAL) routines from the ROM device to the first portion of main memory.

6. The method as defined in claim 5 wherein shadowing the abstraction program to the first portion of main memory further comprises copying the abstraction program from the ROM device to the first portion of main memory.

7. A computer system comprising:
   first and second processors;
   a main memory array;
   a bridge device coupling the processors to the main memory array;
   a read only memory (ROM) coupled to the bridge device, the ROM storing basic input output system (BIOS) routine;

wherein the first processor and a first portion of the main memory array are assigned to be a first partition, and the second processor and a second portion of the main memory array are assigned to a second partition, each partition utilizing a separate operating system; and wherein each of the operating systems use the BIOS routine by calling an entry-point program that ensures that only one instance of the BIOS routine may be executed within the computer system at any one time.

8. The computer system as defined in claim 7 wherein the BIOS routine stored on the ROM further comprises:
a set of processor abstraction layer (PAL) routines;
a set of system abstraction layer (SAL) routines; and
wherein the computer system shadows the PAL and SAL routines to a shadow portion of main memory during a boot sequence of the computer system.

9. The computer system as defined in claim 8 wherein the ROM further comprises:
a PAL entry-point program, the PAL entry-point program designed to ensure that only one instance of PAL routines may be executed within the computer system at any one time;
a SAL entry-point program, the SAL entry-point program designed to ensure that only one instance of SAL routines may be executed within the computer system at any one time; and
wherein the computer system shadows the PAL and SAL entry-point programs to the shadow portion of the main memory during the boot sequence of the computer system.

10. A method of operating a computer system comprising:
applying power to the computer system to initiate a boot sequence;
determining available system resources;
dividing the available system resources into partitions;
starting independent operating systems in each partition;
providing to each operating system a painter to an entry-point program through which a basic input output system (BIOS) program may be accessed by each operating system; and
allowing only one instance of the BIOS program to execute in the computer system.

11. The method as defined in claim 10 wherein providing to each operating system the pointer to the entry-point program through which the BIOS program may be accessed further comprises providing the pointer to a location in a main memory where a BIOS entry-point program resides, the entry-point program performing the allowing.

12. The method as defined in claim 11 wherein the BIOS program further comprises a plurality of BIOS programs, and wherein the entry-point program allows only one instance of each BIOS program to execute in the computer system.

13. The method as defined in claim 12 wherein the BIOS programs further comprise processor abstraction layer (PAL) programs and system abstraction layer (SAL) programs and wherein the entry-point program further comprises a PAL entry-point program and a SAL entry-point program, and wherein the PAL and SAL entry-point programs allow only one instance of each PAL and SAL program, respectively, to execute in the computer system.

14. A computer readable storage medium storing instructions that when executed by a processor cause the processor to implement spinlocks for a basic input output system (BIOS) routine as called by a first and second operating systems operating in hardware partitions in a computer system, the instructions comprising:
invoking the BIOS routine if the BIOS routine is not in use; and
refraining from invoking the BIOS routine if the BIOS routine is in use.

15. The computer readable storage medium as defined in claim 14 wherein the invoking instruction further comprises calling a BIOS entry-point program if the BIOS routine is not in use.

16. The computer readable storage medium as defined in claim 15 wherein calling the BIOS entry-point program further comprises calling one of a processor abstraction layer (PAL) entry-point program and a system abstraction layer (SAL) entry-point program, the PAL and SAL entry-point programs providing access to specific PAL and SAL routines.

17. A computer system comprising:
a first and second means for executing software programs;
a means for storing software programs for execution;
wherein the first means for executing and a first portion of the means for storing is assigned to be a first partition, and the second means for executing and a second portion of the means for storing is assigned to be a second partition, each partition utilizing a separate software means for operating hardware within a partition; and
wherein each of the software means for operating use a means for performing a basic input output system (BIOS) function by calling a software means for ensuring that only one instance each means for performing a BIOS function may be executed within the computer system.

18. The computer system as defined in claim 17 wherein the means for performing a BIOS function further comprises a BIOS routine.

19. The computer system as defined in claim 18 wherein the software means for ensuring further comprises a software routine programmed to ensure that only one instance the BIOS routine may be executed within the computer system.

20. The computer system as defined in claim 17 wherein the means for storing software programs for execution further comprises a main memory array.

21. The computer system as defined in claim 20 wherein the main memory array comprises a plurality of random access memory (RAM) devices.

22. The computer system as defined in claim 17 further comprising means for long-term storage of the means for performing.

23. The computer system as defined in claim 22 wherein the means for long-term storage further comprises a read only memory (ROM) device.

* * * * *

UNITED STATES PATENT AND TRADEMARK OFFICE
CERTIFICATE OF CORRECTION

| | | |
|---|---|---|
| PATENT NO. | : 7,103,766 B2 | Page 1 of 1 |
| APPLICATION NO. | : 10/324946 | |
| DATED | : September 5, 2006 | |
| INVENTOR(S) | : Darren J. Cepulis et al. | |

It is certified that error appears in the above-identified patent and that said Letters Patent is hereby corrected as shown below:

In column 6, line 26, in Claim 2, delete "arid" and insert -- and --, therefor.

In column 7, line 37, in Claim 10, delete "painter" and insert -- pointer --, therefor.

In column 7, line 45, in Claim 11, after "may" delete "the" and insert -- be --, therefor.

Signed and Sealed this

Twentieth Day of January, 2009

JON W. DUDAS
*Director of the United States Patent and Trademark Office*